United States Patent
Coldiron, Sr.

(10) Patent No.: US 10,613,854 B2
(45) Date of Patent: Apr. 7, 2020

(54) SYSTEMS AND METHODS FOR AUTOMATED RENUMBERING, REFORMATTING, AND RE-REFERENCING OF BRANCHING STATEMENTS OR GO-TO INSTRUCTION LINE REFERENCING WITHIN MODIFIED CODE USING A DUAL-PASS APPROACH THAT INCLUDES OPERATIONS USING PREDICTED NEW LINE NUMBERS, ERROR DETECTION/CORRECTION, AND ALIGNMENT CORRECTION PROCESSING

(71) Applicant: The United States of America, as represented by the Secretary of the Navy, Crane, IN (US)

(72) Inventor: Gary L. Coldiron, Sr., Bloomington, IN (US)

(73) Assignee: The United States of America, as Represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/853,708

(22) Filed: Dec. 22, 2017

(65) Prior Publication Data
US 2019/0196810 A1 Jun. 27, 2019

Related U.S. Application Data

(60) Provisional application No. 62/437,914, filed on Dec. 22, 2016.

(51) Int. Cl.
*G06F 9/44* (2018.01)
*G06F 8/72* (2018.01)
*G06F 8/41* (2018.01)
*G06F 8/30* (2018.01)
*G06F 8/33* (2018.01)

(52) U.S. Cl.
CPC ............... *G06F 8/72* (2013.01); *G06F 8/30* (2013.01); *G06F 8/33* (2013.01); *G06F 8/423* (2013.01); *G06F 8/427* (2013.01)

(58) Field of Classification Search
CPC ..... G06F 8/33; G06F 8/51; G06F 8/70; G06F 8/72
See application file for complete search history.

(56) References Cited

U.S. PATENT DOCUMENTS

| | | | | |
|---|---|---|---|---|
| 4,241,403 A * | 12/1980 | Schultz | ............ | G07C 5/085 701/32.5 |
| 6,336,094 B1 * | 1/2002 | Ferguson | ............ | G06K 9/2054 705/35 |
| 7,877,731 B2 * | 1/2011 | Bekelman | ............ | G06F 8/10 717/105 |
| 2005/0172273 A1 * | 8/2005 | Volini | ............ | G06F 17/2745 717/136 |
| 2007/0011654 A1 * | 1/2007 | Opperman | ............ | G06F 8/70 717/122 |

(Continued)

*Primary Examiner* — Duy Khuong T Nguyen
(74) *Attorney, Agent, or Firm* — Naval Surface Warfare Center, Crane Division; Christopher A. Monsey

(57) ABSTRACT

Systems and methods for automated renumbering, reformatting, and re-referencing of branching statements or go-to instruction line referencing within modified code using a dual-pass approach that includes operations using predicted new line numbers, error detection/correction, and alignment correction processing.

3 Claims, 16 Drawing Sheets

(56) References Cited

U.S. PATENT DOCUMENTS

| | | | |
|---|---|---|---|
| 2007/0169023 A1* | 7/2007 | Bera | G06F 8/72 |
| | | | 717/136 |
| 2009/0064091 A1* | 3/2009 | Tonkin | G06F 8/42 |
| | | | 717/104 |
| 2015/0113412 A1* | 4/2015 | Peyton | G06Q 10/10 |
| | | | 715/732 |

* cited by examiner

| BLOCK ID | DESCRIPTION |
|---|---|
| GUI GENERATOR (FIGS 2A, 2B) | Generates GUIs to enable user inputs |
| A | Pre-Pass and Opening ATLAS Program File AtlasOldFile and Initialization of data structures |
| B | Read Atlas file statements, error checking, determining if a GOTO statement exists in a selected statement with a GOTO target number, get target number string, search branch number associated with target number string, determine if target number (branch) already exists, then store GOTO target number in BranchBuff if not already exists then repeat at Read Atlas file statements until no further file statements found. |
| C - PASS 1 CODE | Search for KeyWord in OLD or pre-modification Atlas code including preprocessing directives (e.g., DEFINE) and statements (e.g., WHILE) an increment various data variables which are used in renumbering from old to new Atlas file including searching for Atlas statements which require restarting of line number sequence e.g., with a step number set to "00". |
| D - PASS 2 CODE | Search for Keywords in NEW or post modification Atlas code along with steps associated with automated renumbering, reformatting, and rereferencing of branching statements or go-to instruction line referencing between old and new Atlas code. |
| E - SUBROUTINE 'ALIGN' | Corrects user's faulty Atlas line number field by performing realignment functions to ensure modified Atlas line no. will correctly compile |
| F - SUBROUTINE 'GetAtlasLn' | Collects all lines in a single Atlas statement by reading each line and parsing all of the fields, detecting errors, performing specified repairs, populating various data structures and returning to the calling statement the quantity of lines in the statement, the line no. field, the Atlas Keyword, and an error code |
| G - FUNCTION 'GetDestNo' | Extracts the target or destination line number string segment from an Atlas 'GO TO' statement and returns the no. string to the calling statement or, in the event of an error, returns the literal string 'BAD' |
| H - SUBROUTINE 'MakeAtlasNO' | Builds a new Atlas line number based upon the current line no. and the current step no. presented to it by the calling statement; the new Atlas line no. is returned to the caller as an 8-char string with the new line no. centered in the string with a space on either end |
| I - FUNCTION 'GenParse' | Extracts all subfields in a string each delimited by whatever character is requested by the calling statement and returns the subfields in a global string array while returning the quantity of subfields found as the function return value |

*FIG. 14*

SYSTEMS AND METHODS FOR AUTOMATED RENUMBERING, REFORMATTING, AND RE-REFERENCING OF BRANCHING STATEMENTS OR GO-TO INSTRUCTION LINE REFERENCING WITHIN MODIFIED CODE USING A DUAL-PASS APPROACH THAT INCLUDES OPERATIONS USING PREDICTED NEW LINE NUMBERS, ERROR DETECTION/CORRECTION, AND ALIGNMENT CORRECTION PROCESSING

CROSS-REFERENCE TO RELATED APPLICATION

This application is a Non Provisional application claims priority to U.S. Provisional Patent Application Ser. No. 62/437,914, filed on Dec. 22, 2016, entitled ATLAS WORX, the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,399) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present inventions relates to systems and methods for enabling modification of software source code or machine readable instructions that have various types of elements which require significant effort to modify and are susceptible to errors when later modified. In particular, systems and methods for automated renumbering, reformatting, and re-referencing of branching statements or go-to instruction line referencing within modified code using a dual-pass approach.

Engineers in the Navy have sought to address disadvantages associated with current programming tools. Barriers to finding a solution to this long felt but unmet problem likely included how algorithms to perform various functions associated with embodiment of the invention are complex as they track lines of code as they are being assigned. For example, programs written in the Navy's circuit testing language ATLAS require line numbers for every line of code. When changes are made to a program written in the ATLAS language, the entire program must be renumbered. Renumbering the entire program leads to wasted time and effort. Additionally, the manual renumbering task is fraught with error and typically induces human error into the code creating compile difficulties. Prior to the invention, ATLAS programmers made numerous line deletions and insertions to their code but were then compelled to re-establish the line number order throughout the program. Every such line deletion/insertion necessitates that a substantial region of the code be completely renumbered. The ATLAS programmer had to make these line number changes by retyping new line numbers into their program. He/she had to be extremely careful that the lines numbers flowed in exact order and preferred increment. Additionally, and very problematically, he/she had to track the target line numbers, e.g., the line numbers that were destinations of branching statements. If the code insertions crossed logical boundaries, subsequent sections would also have to be renumbered thereby greatly increasing probability of error.

Various embodiments of the invention have been created including one referred to as 'ATLAS Worx'. Various embodiment include a personal computer (PC)-based program. Various code elements provide a variety of capabilities. For example, an embodiment of the invention allows an ATLAS test developer to automatically renumber his/her ATLAS code after numerous changes are made to a program. The ATLAS developer no longer needs to track his/her line numbers or the "target" lines used in "code jumps", etc. when making changes. Some embodiments include detailed & complex algorithms that flow through the ATLAS code and maintain a database of line numbers and all target line numbers. The program then passes again and makes all of the required changes to the line numbers and begins ATLAS "sections" of code at logical boundaries.

'ATLAS Worx' embodiments provide novel functionality or utility in a variety of ways. For example, at least some embodiments provide a capability for completely renumbering an entire ATLAS program for the ATLAS code developer. In so doing, it will assign "zero-suffix" line numbers at logical ATLAS code boundaries, assign uniform line number increments for every line, and fully track all target line numbers and make corresponding changes to the new assignments. 'ATLAS Worx' requires only a small processing time for the ATLAS programmer to identify his/her ATLAS program (e.g., PC-based directory browser) then approximately several seconds to renumber and make all of the necessary changes to the ATLAS program. A resulting ATLAS program may be written over the old program or stored in its own new file (e.g., as a default setting). Much complexity arises from functions such as an ability of at least some 'ATLAS Worx' embodiments to change branching numbers to new target numbers as they are being reassigned. In particular, in at least some embodiments, 'ATLAS Worx' will adjust the numbering so that key ATLAS sections will start with a new line number series (e.g., a line number "rolls over" and a step number. starts with "00").

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 14 shows a summarized description of various subroutines or blocks of source code in accordance with one embodiment of the invention.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
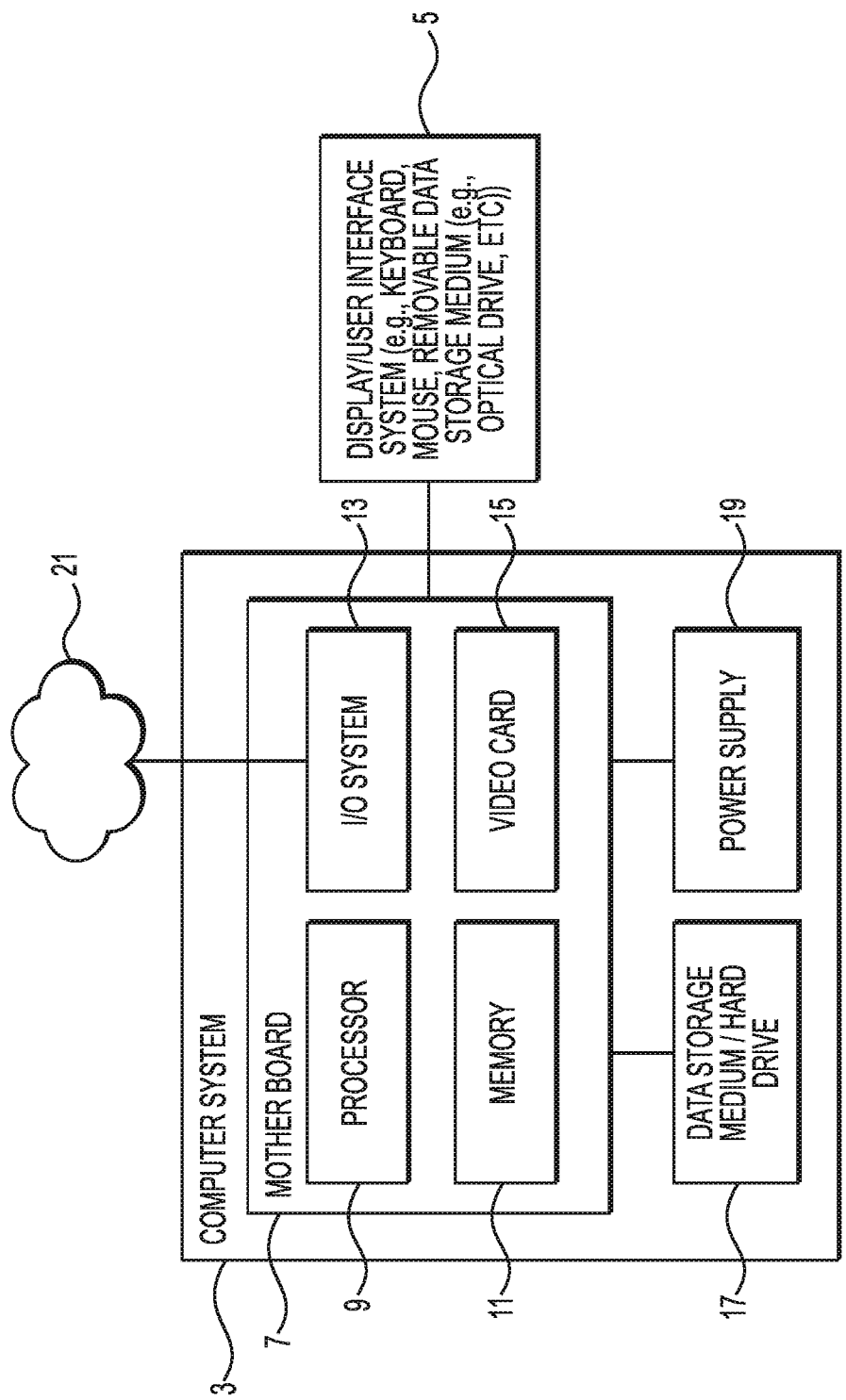
FIG. 1 shows a hardware architecture in accordance with one embodiment of the invention.

FIG. 1 shows a hardware architecture 1 in accordance with one embodiment of the invention. In particular, a computer system 7 is shown that includes a mother board 7, processor 9, input/output (I/O) system 13, a memory 11, a video card 15, a data storage medium/hard drive 17, and a power supply 19. The I/O system 13 can include a network card (not separately shown) that couples with an external network 21. A display and user interface system 5 is provided which couples with the computer system 1. Machine instructions (not separately shown) are stored on the data storage medium/hard drive 17 which includes machine instructions that execute functions or processing in accordance with embodiments of the invention.

Figure 2A:
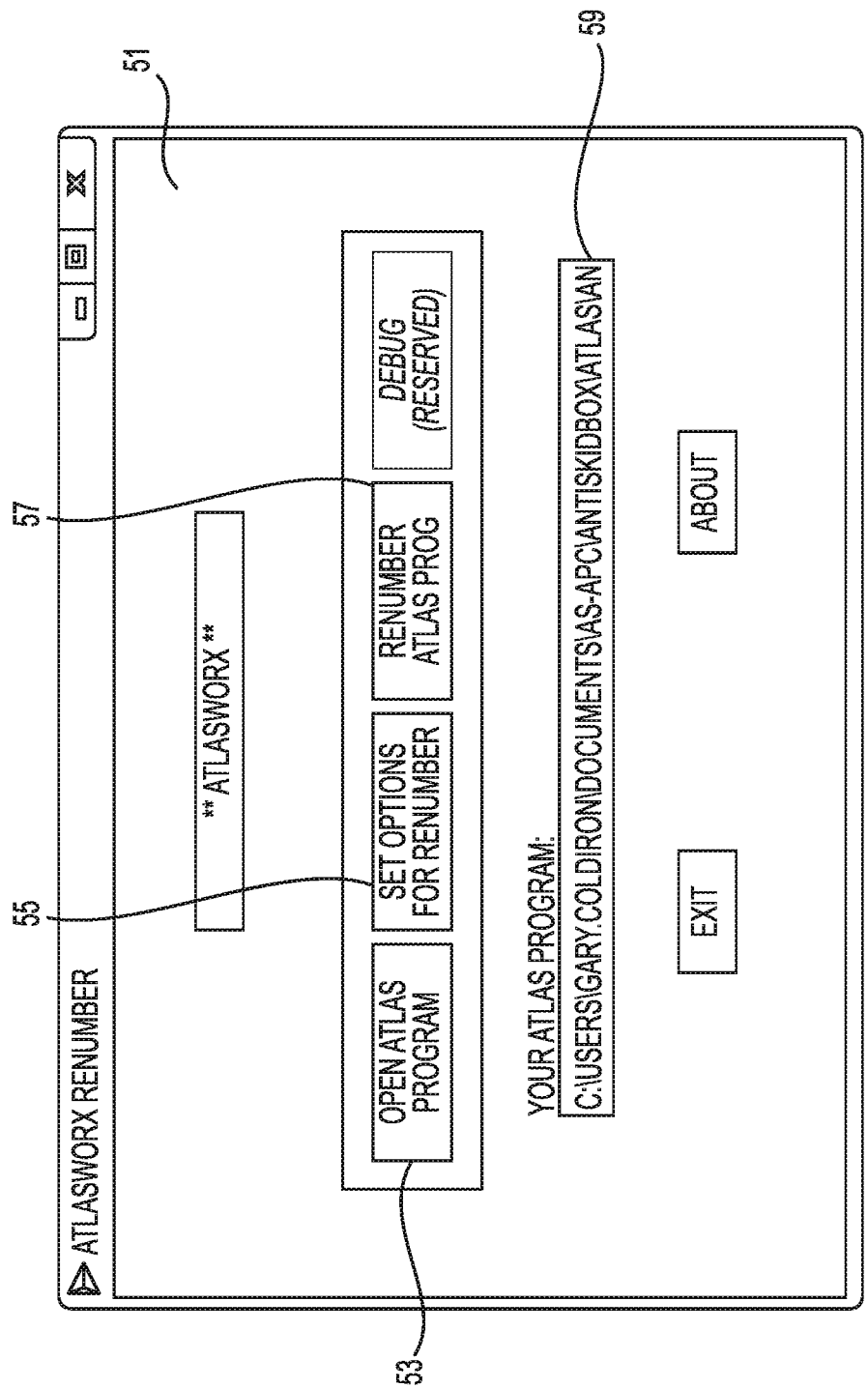
FIG. 2A shows a graphical user interface (GUI) in accordance with one embodiment of the invention.

FIG. 2A shows a graphical user interface (GUI) in accordance with one embodiment of the invention. In particular, an initial AtlasWorx Renumber GUI 51 is shown which provides a number of user interface action buttons. An Open ATLAS Program button 53 is provided to open an Atlas-Worx program. A Set Options for Renumber button 55 is provided which opens a Set Parameters for Renumber GUI (See FIG. 2B). A Renumber ATLAS Prog Button 57 is provided which executes renumbering operations. A Your ATLAS Program file path window 59 is provided which enables a user to input a file path.

Figure 2B:
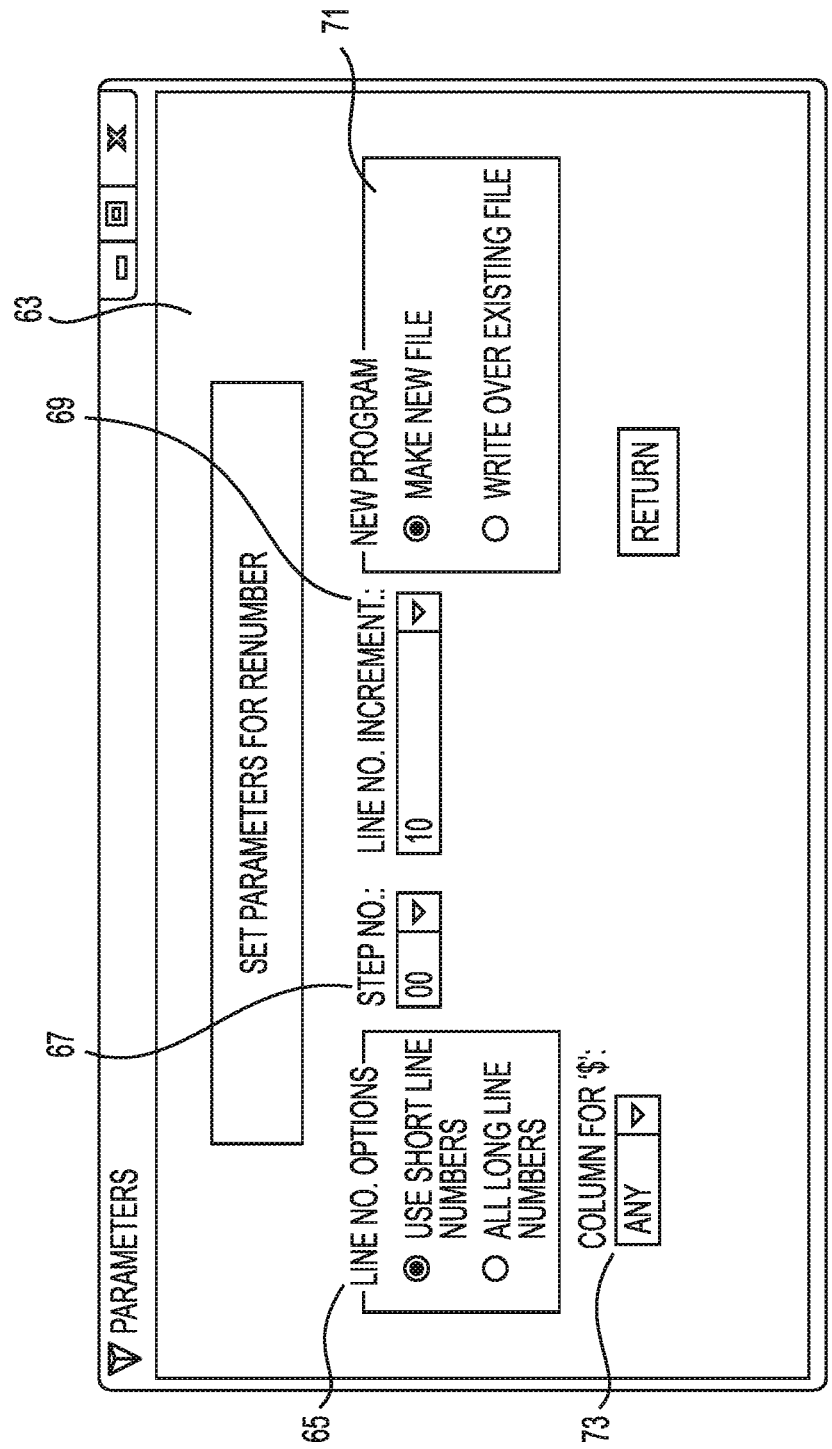
FIG. 2B shows another GUI in accordance with one embodiment of the invention.

FIG. 2B shows a Set Parameters for Renumber GUI which includes various setting input window sections. A first window section includes a Line No. Options section 65 which have radio buttons for selecting Use Short Line Numbers or All Long Line Numbers. A second window section provides a Step No. 67 drop down menu to select numeric identifiers e.g. "00". A third window section provides a Line Number Increment 69 drop down menu which enables selection of an increment value e.g., "10". A fourth window section provides a New Program 69 selection area which provides radio buttons for Make a New File or Write Over Existing File. A fifth window section provides a drop down menu providing a means for selecting a specific Column for "$" 73 (e.g., "Any").

Figure 3:
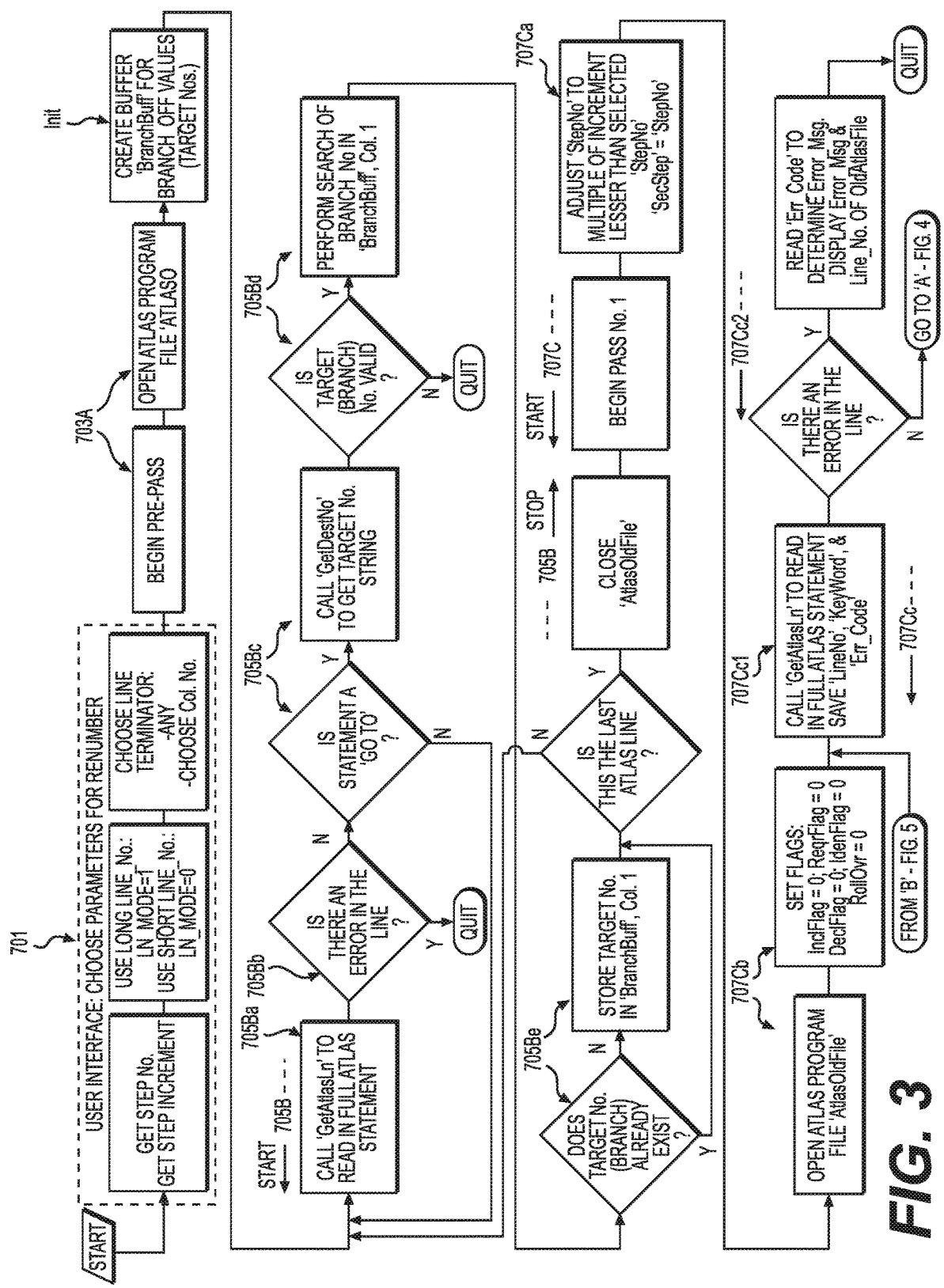
FIG. 3 shows a flow chart associated with processing steps performed by segments of source code in accordance with one embodiment of the invention.

FIG. 3 shows a flow chart associated with processing steps performed by segments of source code in accordance with one embodiment of the invention. An annotated computer source code appendix as well as an annotated flow chart that corresponds to FIGS. 3-13 is also filed both of which are incorporated by reference herein. Where if there is any missing subject matter or conflict between FIGS. 3-13 and the annotated code appendix/annotated flow chart filed as a source code appendix are discovered, the source code appendix along with its corresponding annotated flow chart takes precedence. In particular, processing in at least one embodiment starts at Step 701: User Selection of Renumbering Parameters using GUIs (FIGS. 2A and 2B) including selection of step number (StepNo), step increments, select long or short line numbers, and select line terminator. At Step 703: Begin Pre-Pass, open source file (e.g., ATLAS old file), create and initialize BranchBuff data structure for Branch_Off values (Target Numbers). At Step 705 begin loop (B) comprising executing a GetAtlasLine function to read in an Atlas statement (Ba), checking for errors in the Atlas statement based on error matching criteria (Bb), determining if the Atlas statement is a goto statement (Bc), calling GetDestNo function to get target no string if a goto statement found (also Bc), determining if target (branch) No. is valid (Bd), perform search of branch no in BranchBuff column 1 (Bc), determining if target number (branch) already exists (Be), store target no. in BranchBuff column 1 (Be), repeat loop if not the last line of the Atlas old file or close the open source file (e.g., the ATLAS old file). At Step 707(C): Begin Pass 1. Step 707Ca: Adjust StepNo to multiple of increment lesser than selected in StepNo. Step 707Cb: Open ATLAS program file "AtlasOldFile and set flags and continue Step 707c1. At Step 707Cc1: Call GetAtlasLn to read in full ATLAS Statement, save LineNo, Keyword and Err Codes then continue at Step 707c2 and check for an error; if" no error continue at Step 707Cc4.

Figure 4:
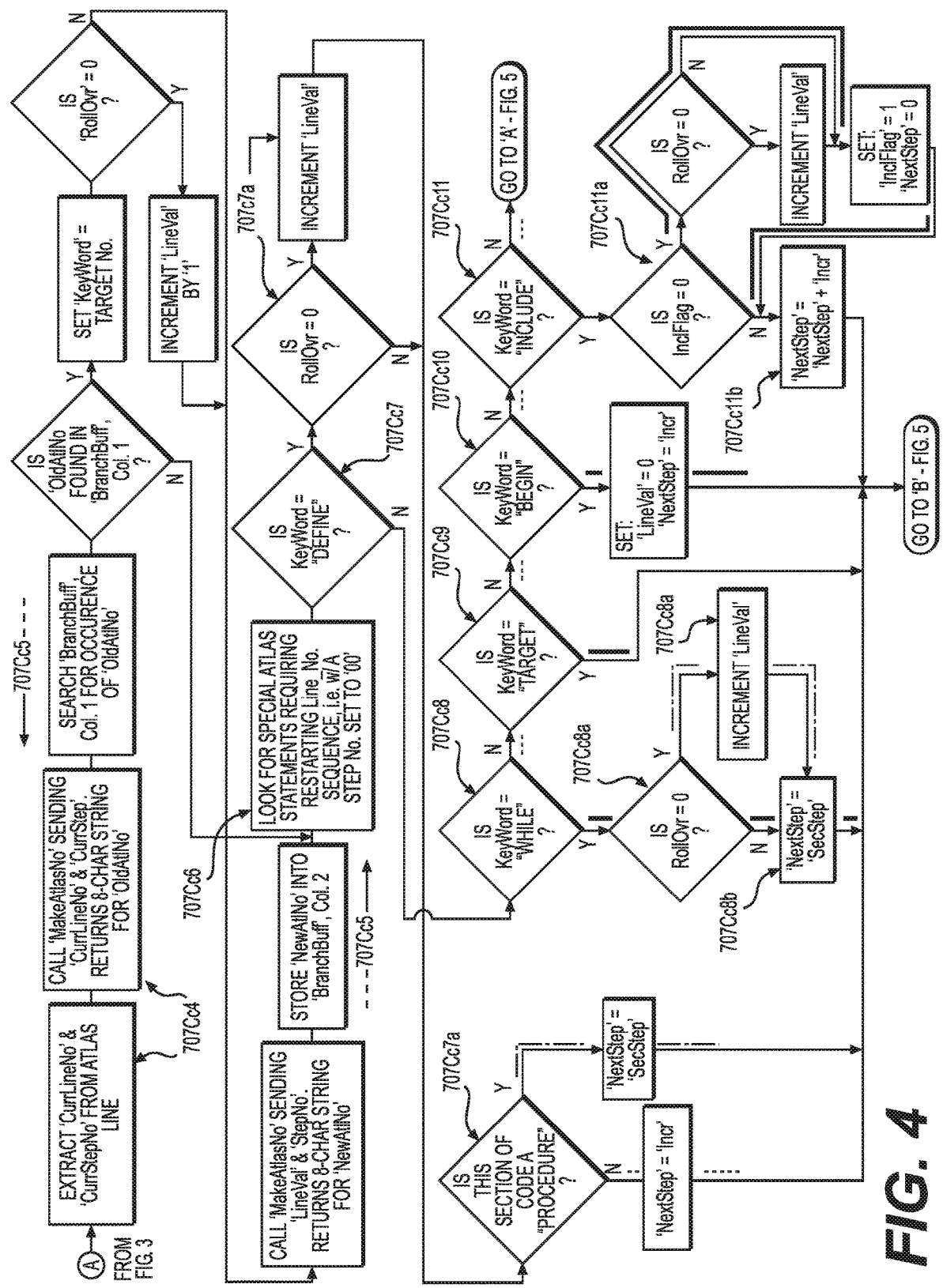
FIG. 4 shows a flow chart associated with processing steps performed by segments of source code in accordance with one embodiment of the invention.

Referring to FIG. 4, at Step 707Cc4: extract CurrLineNo and CurrStepNo from Atlas line. At Step 707Cc4: call MakeAtlasNo sending CurrLineNo and CurrStep and returning 8-char string for OldAtlNo. At Step 707Cc5: search BranchBuff, Col 1 for occurrence of OldAtlNo; determine if OldAtlNo is found in BranchBuff Col 1; (if no, then skip to Step 707c6; if yes, then set Keyword to Target No then determine if RollOver=0; if RollOver does not equal 0/is no, then call MakeAtlasNo sending LineVal and StepNo with a return of an 8 character string for NewAtlNo; if RollOver does equal 0/is yes, then increment lineVal by 1 then call MakeAtlasNo sending LineVal and StepNo with a return of an 8 character string for NewAtlNo) and continue processing at Step 708Cc6. At Step 707Cc6: Search for ATLAS statements requiring restarting line number sequence (e.g., with a step number set to "00"). At Steps 707Cc7: Determine if KeyWord="DEFINE"? If yes at Step 707c7, then determine if RollOver=0? if RollOver=0, then increment LineVal and continue processing at Step 708c7a; if no, then continue processing at Step 707Cc7a. At Step 707Cc7a: determine if this section of code is a PROCEDURE? If yes (a procedure), then set NextStep equal to SecStep and jump to Step 707Cc16; If no, then set NextStep=Incr and jump to Step 707Cc16. At Step 707Cc8*a*: determine if RollOver=0? (if yes, increment LineVal and execute Step 707Cc8*b*; if no, execute Step 707Cc8*b* by setting NextStep=SecStep and continuing processing at Step 707Cc16. At Step 707Cc9: determine if KeyWord=Target? If yes, then continue processing at step 707Cc16; if no, then continue processing at Step 707Cc10. At Step 707Cc10: determine if KeyWord=Begin? If yes, then, set LineVal=0 and NextStep=Incr then continue processing at step 707*c*16; if no, then continue processing at Step 707*c*11. At Step 707Cc11: determine if KeyWord=INCLUDE? If yes, then continue processing at Step 707Cc11*a*; if no, then continue processing at Step 707Cc12. At Step 707Cc11*a*: Determine if InclFlag=0? If yes, then determine if RollOver=0 then determine if RollOver=0? If RollOver=0, then increment LineVal and set InclFlag=1, NextStep=0 then continue processing at Step 707Cc11*b*; if RollOver does not equal 0, then set InclFlag=1, NextStep=0 then continue processing at Step 707Cc11*b*. At Step 707Cc11*b*: Set NextStep=NextStep+Incr then continue processing at Step 707Cc16.

Figure 5:
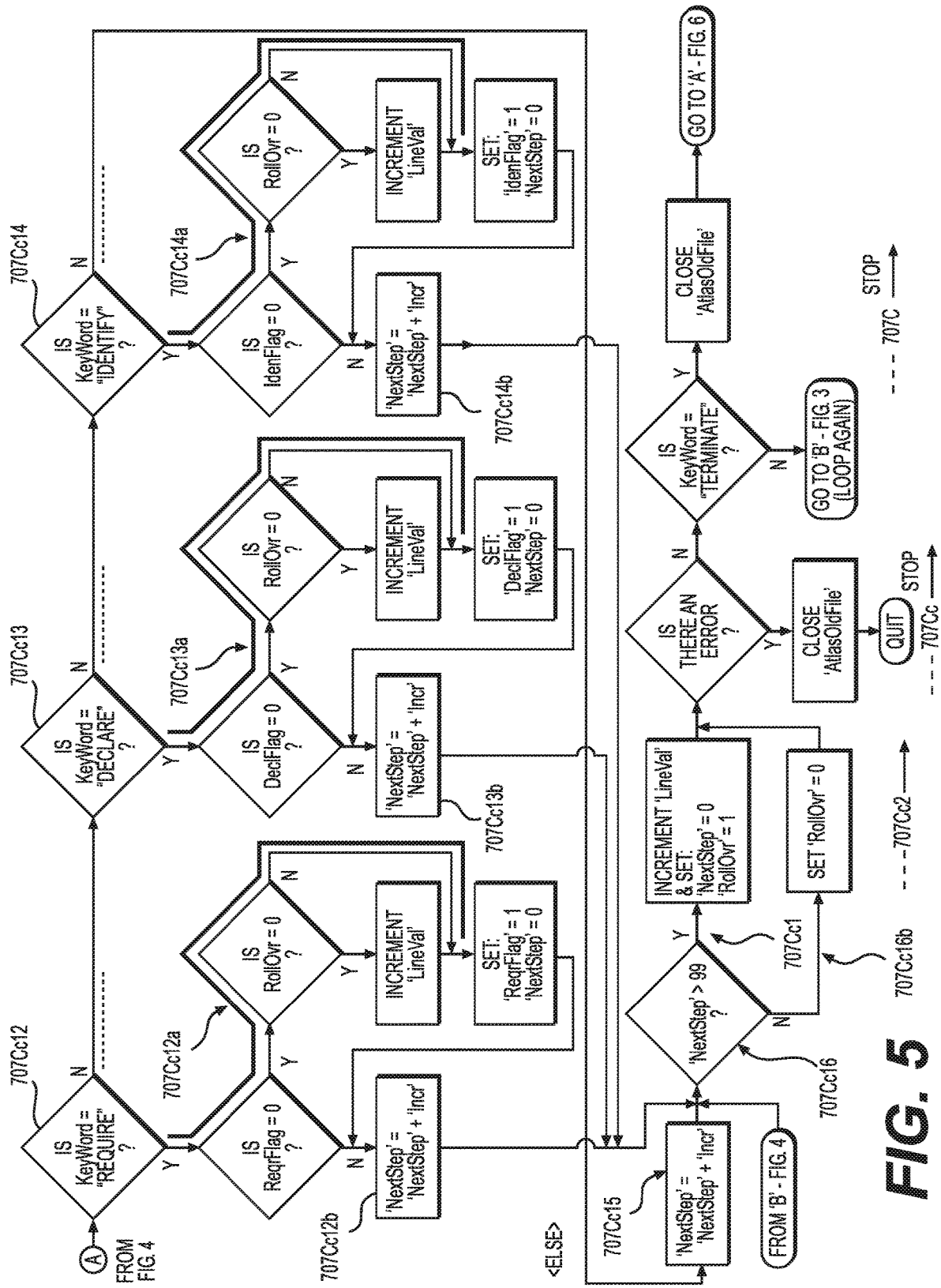
FIG. 5 shows a flow chart associated with processing steps performed by segments of source code in accordance with one embodiment of the invention.

Referring to FIG. 5, At Step 707Cc12: determine if KeyWord=REQUIRED? If yes, then execute Step 707Cc12*a*; if no, then execute Step 707Cc12*b*. At Step 707Cc12*a*: Determine if RollOver=0; if no, then set ReqrFlab=1, NextStep=0 then continue processing at Step 707Cc12*b*; if yes, then increment LineVal, then set ReqrFlab=1, NextStep=0 then continue processing at Step 707Cc12*b*. At Step 707Cc12*b*: Set NextStep=NextStep+Incr then continue processing at Step 707Cc16. At Step 707Cc13: Determine if Keyword=DECLARE? If no, then continue processing at Step 707Cc14; if yes, then next determine if DeclFlag=0; if no then determine if RollOvr=0 where if RollOver=0 then increment LineVal, Set DeclFlag=1, Next Step=0 then continue processing at Step 707Cc13*b*; if RollOver does not equal 0 then Set DeclFlag=1, Next Step=0 then continue processing at Step 707Cc13*b*. At Step 707Cc13*b*: set NextStep=NextStep+Incr then continue processing at Step 707Cc16. At Step 707Cc14: determine if KeyWord=Identify? If no, then execute Step 707Cc15; if yes, then increment LineVal, set DeclFlag=1, Next Step=0 then continue processing at Step 708Cc13*b*. At Step 707Cc16: determine if NextStep is greater than 99? If yes, then execute Step 707Cc16*a* if no, then execute Step 707Cc16*b*. At Step 707Cc16*a*: Increment LineVal and set NextStep=0, RollOver=0 then determine if an error exists; if an error is found, then close AtlasOldFile and terminate processing; if no error found, then determine if KeyWord=terminate? If KeyWord does not equal terminate, then execute loop and return to Step 707Cc1 for continued processing; if KeyWord does equal terminate, then close AtlasOldFile and continue processing at 709D which begins Pass Number 2 and ends processing for Code Block C.

Figure 6:
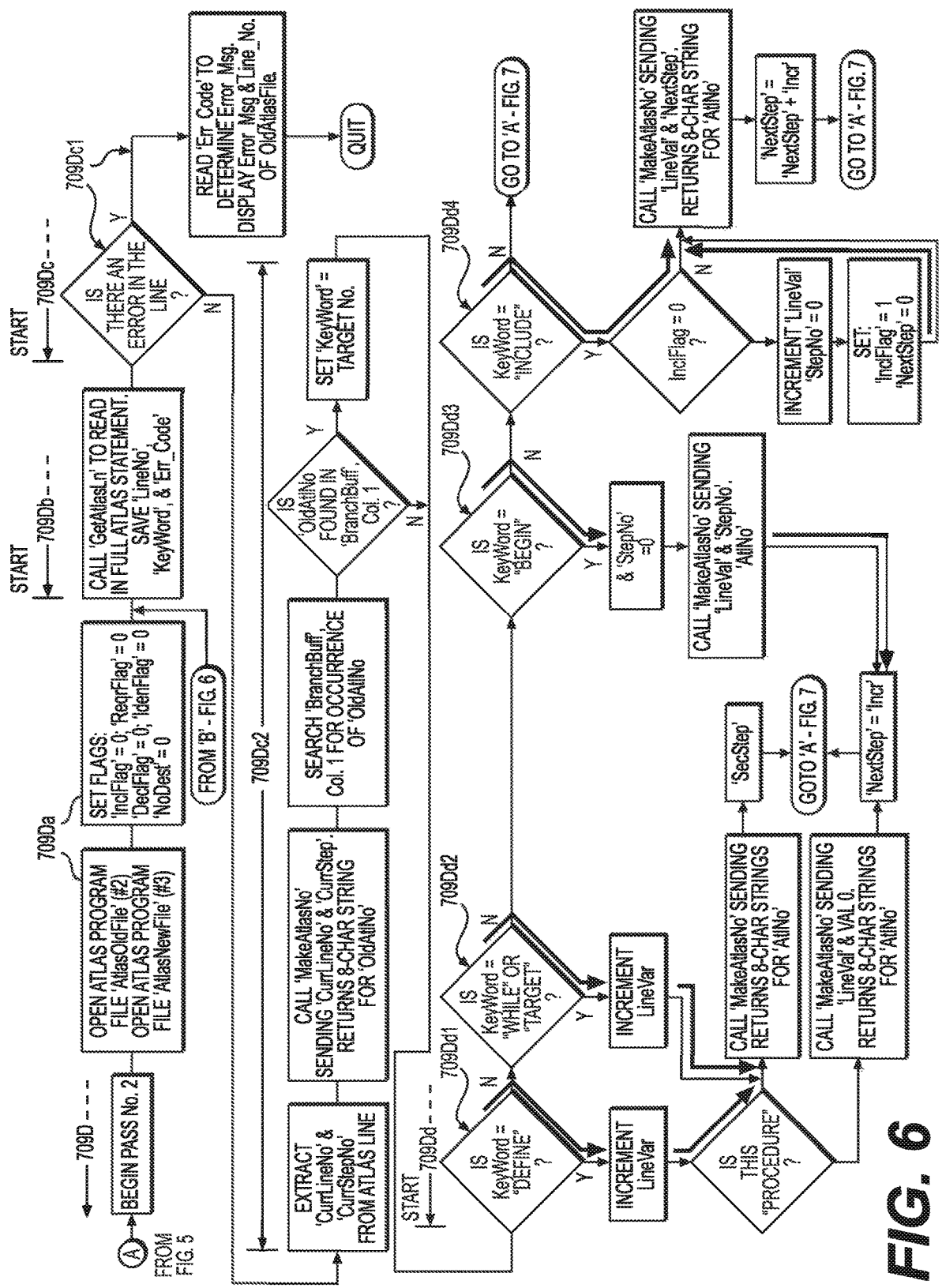
FIG. 6 shows a flow chart associated with processing steps performed by segments of source code in accordance with one embodiment of the invention.

Referring to FIG. 6, at Step 709D: Begin Pass Number 2 and processing for Code Block D by executing Step 709Da At Step 709Da: Open ATLAS Program file AtlasOldFile (#2) and Open ATLAS program file AtlasNewFile (#3) then set flags: 'InclFlag'=0; 'ReqrFlag'=0; 'DeclFlag'=0; 'IdenFlag'=0; 'NoDest'=0. At Step 709Db: Call 'GetAtlasLn' to read in a full ATLAS statement then Save 'LineNo', 'KeyWord', and 'Err_Code' then continue processing at Step 709Dc1. At Step 709Dc1: determine if there is an error in the ATLAS Statement? If yes, then read Er_Code to determine error message then display the error message and line number of the Old AtlasFile then quit; if no error, then continue processing at Step 709Dc2. At Step 709Dc2: Extract 'CurrLineNo' & 'CurrStepNo' from Atlas Line; Call 'MakeAtlasNo' sending 'CurrLineNo' & 'CurrStep' which returns 8-char string for 'OldAtlNo'; then Search 'BranchBuff', col. 1 for occurrence of 'OldAtlNo'; then Search 'BranchBuff', col. 1 for occurrence of 'OldAtlNo'; then determine if 'OldAtlNo' is found 'BranchBuff', col. 1 where if it is, then set KeyWord=TargetNo then continue processing at Step 709Dd1 where if it is not, then continue processing at Step 709Dd1. At Step 709Dd1: determine if KeyWord=DEFINE? If no, continue processing at Step 709Dd2; if yes, then Call 'MakeAtlasNo' sending LineVal and StepNo, Returns 8-char string for 'AtlNo' then setting NextStep=SecStep and continuing processing at Step 709Dd5. At Step 709Dd2: Determine if KeyWord=WHILE or TARGET? If no, then continue processing at Step 709Dd3; if yes, then increment LineVar then call call 'MakeAtlasNo' sending LineVal and StepNo, Returns 8-char string for 'AtlNo' then setting NextStep=SecStep and continuing processing at Step 709Dd5. At Step 709Dd3: Determine if KeyWord=Begin? If no, then continue processing at Step 709Dd4; if yes, then Set LineVal=0 and StepNo=0 then Call MakeAtlasNo sending LineVal and StepNo, returns 8 char string for AltNo then set NextStep=Incr and continue processing at Step 709Dd5. At Step 709Dd4: Determine if KeyWord=Include? If no, then continue processing at Step 709Dd5; if yes, then determine if InclFlag=0? If no, then call MakeAtlasNo sending LineVal and NextStep, returns 8-char string for AltNo then sets NextStep=NextStep+Incr then continue processing at Step 709Dd5; if no, then increment LineVar, set StepNo=0, then set InclFlag=1, NextStep=0, then, then call MakeAtlasNo sending LineVal and NextStep, returns 8-char string for AltNo then sets NextStep=NextStep+Incr then continue processing at Step 709Dd5.

Figure 7:
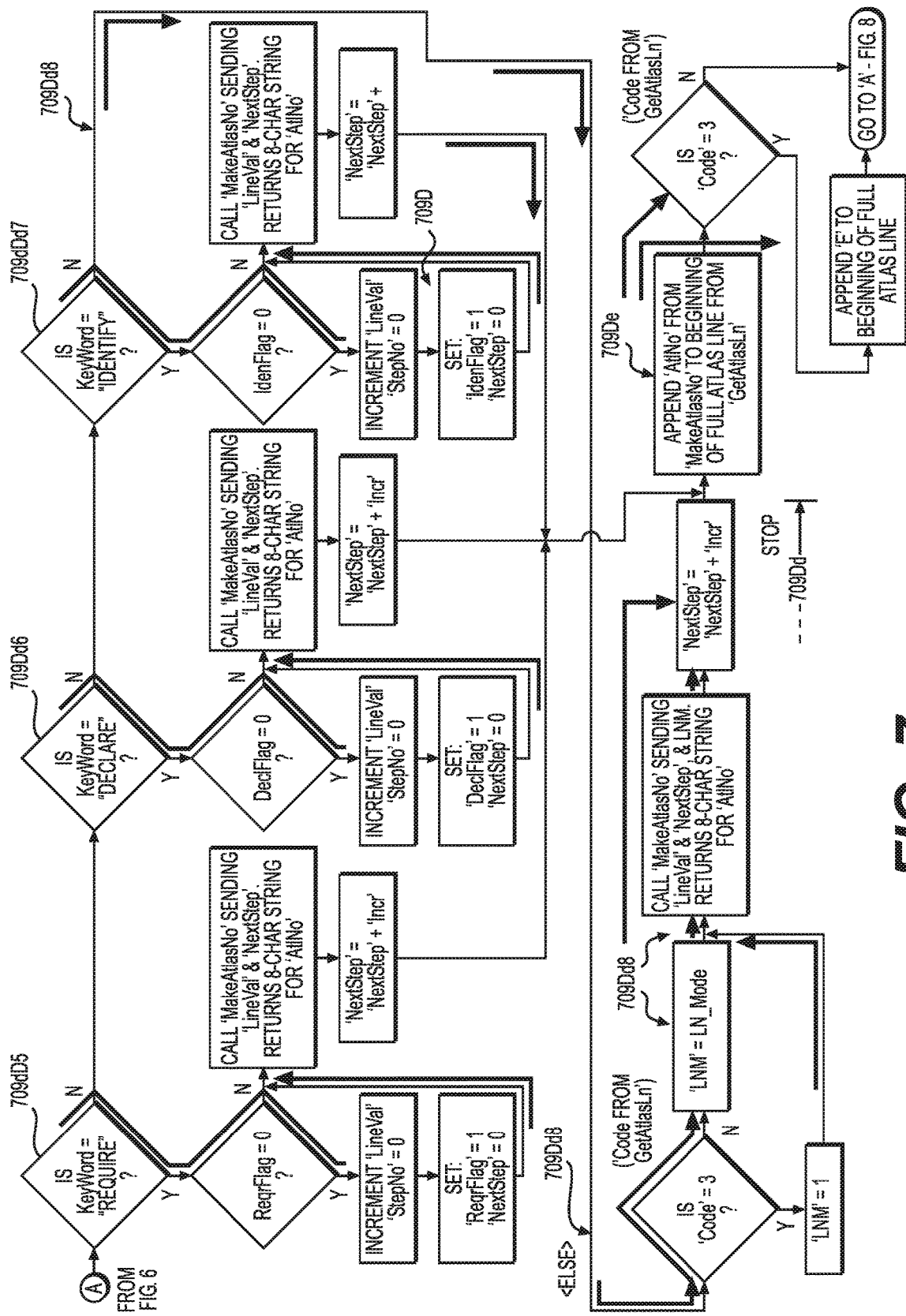
FIG. 7 shows a flow chart associated with processing steps performed by segments of source code in accordance with one embodiment of the invention.

Referring to FIG. 7, at Step 709Dd5: Determine if KeyWord=Require? If no, then continue processing at Step 709Dd6; if yes, then determine if ReqrFlag=0? If yes, then increment LineVal, set StepNo=0, call MakeAtlasNo sending LineVal and NextStep, returning 8 char string for AltNo, setting NextStep=NextStep+incr, then continuing processing at Step 709De. At Step 709Dd6: Determine if KeyWord=Declare? If no, then continue processing at Step 709Dd7; if yes, then determine if IdenFlag=0? If IdenFlag is not 0 no), then call MakeAtlasNo sending LineVal and NextStep, returns 8 char string for AltNo then sets NextStep=NextStep+Incr, then continue processing at Step 709De; if DecFlag is 0, then increment LineVar, set StepNo=0, then set DeclFlag=1, NextStep=0, then call MakeAtlasNo sending LineVal and NextStep, returns 8 char string for AltNo then sets NextStep=NextStep+Incr, then continue processing at Step 709De. At Step 709Dd7: Determine if KeyWord=Identify? If no, then continue processing at Step 709Dd7; if yes, then determine if DeclFlag=0? If DeclFlag is not 0, then call MakeAtlasNo sending LineVal and NextStep, returns 8 char string for AltNo then sets NextStep=NextStep+Incr, then continue processing at Step 709De; if IdenFlag is 0, then increment LineVar, set StepNo=0, then set IdenFlag=1, NextStep=0, then call MakeAtlasNo sending LineVal and NextStep, returns 8 char string for AltNo then sets NextStep=NextStep+Incr, then continue processing at Step 709De. At Step 709Dd8: Determine if Code=3? (Code from GetAtlasLn)? If no, then set LNM=LN_Mode, call MakeAtlasNo sending LineVal and Nextstep, and LNM, returns 8-char string for AltNo then set NextStep=NextStep+incr, append AltNo from MakeAtlasNo to beginning of full ATLAS Line from GetAtlasLn, then set NextStep=NextStep+Incr then continue processing at Step 709De; if Code is not equal to 3, then set LNM=1 and then call MakeAtlasNo sending LineVal and Nextstep, and LNM, returns 8-char string for AltNo then set NextStep=NextStep+incr, append AltNo from MakeAtlasNo to beginning of full ATLAS Line from GetAtlasLn, then set NextStep=NextStep+Incr then continue processing at Step 709De. At Step 709De: Append 'AtlNo' from 'MakeAtlasNo' to begi-ning of full ATLAS line from 'GetAtlasLn' then determine if Code=3? If no, then continue processing at Step 709Df; if yes, the append "E" to beginning of full ATLAS line and continue processing at Step 709Df.

Figure 8:
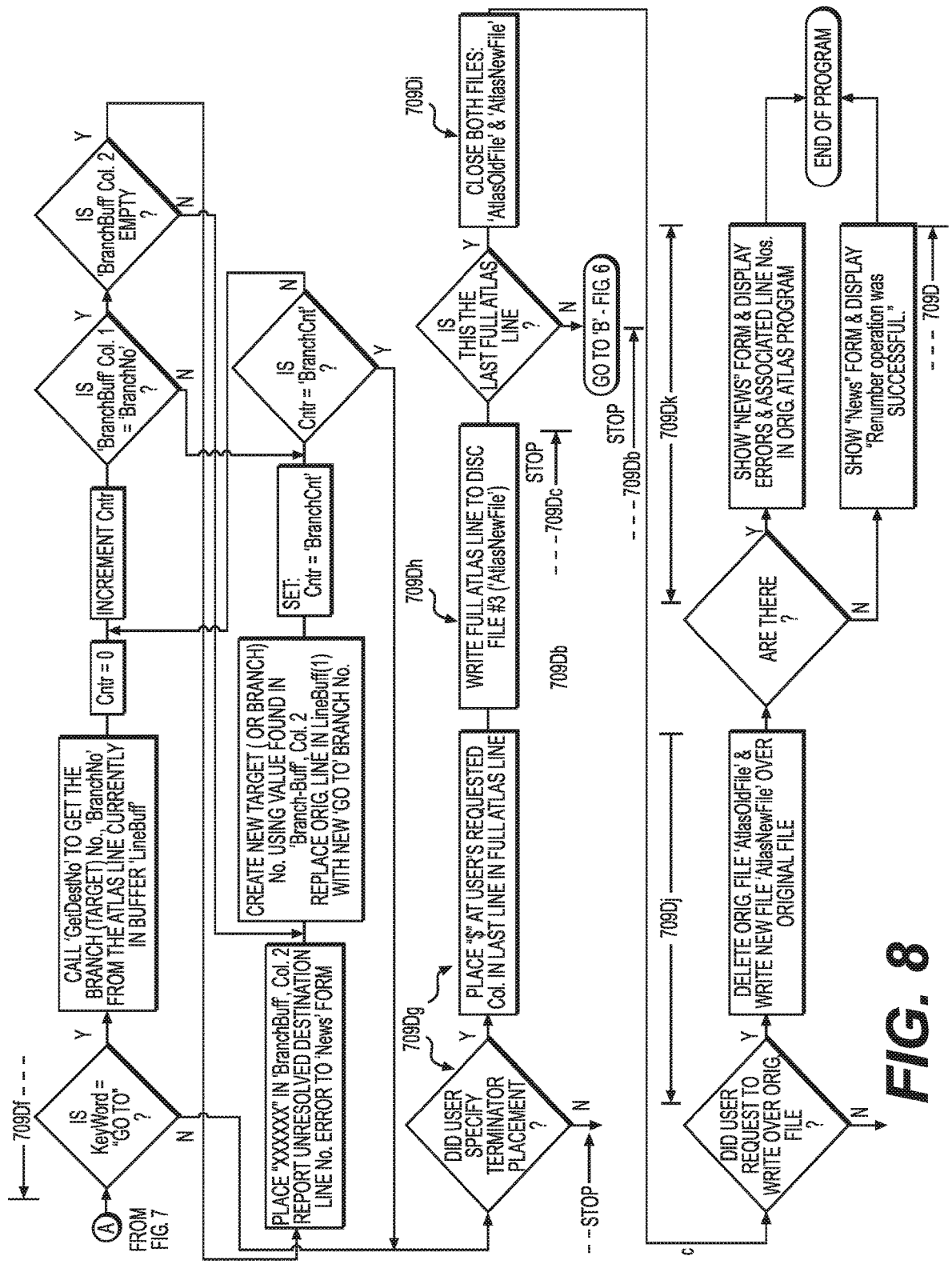
FIG. 8 shows a flow chart associated with processing steps performed by segments of source code in accordance with one embodiment of the invention.

Referring to FIG. 8, at step 709Df: Determine if KeyWord=Goto? If no then call Call 'GetDestNo' to get the Branch (Target) no., 'BranchNo' from the ATLAS line currently in buffer lineBuff, set Cntr=0, increment Cntr, determine if 'BranchBuff' col.1='BranchNo' where if it is then further determine if BranchBuff col 2 is empty.

Figure 9:
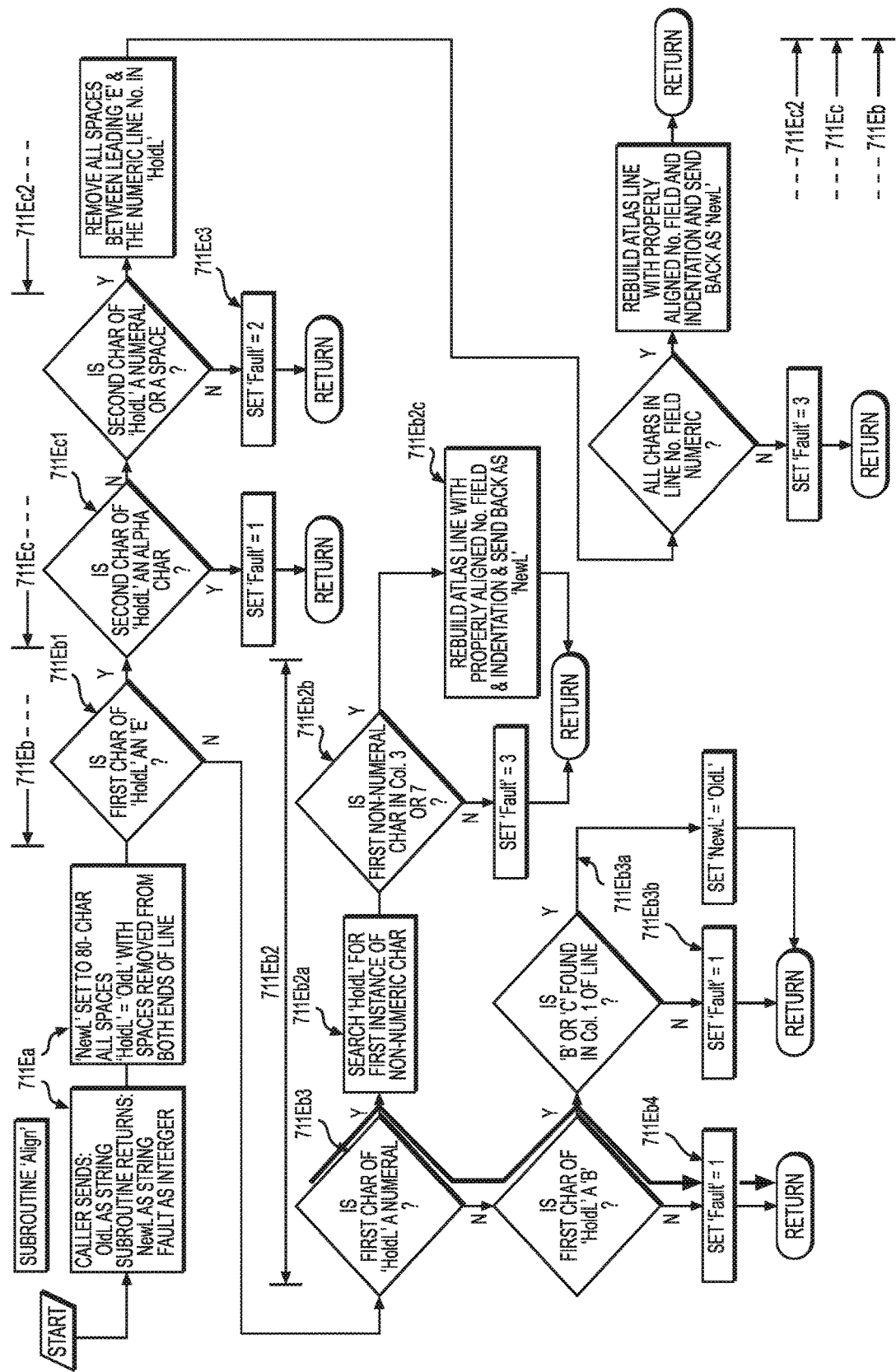
FIG. 9 shows a flow chart associated with processing steps performed by segments of source code in accordance with one embodiment of the invention.

FIG. 9 shows a flow chart associated with processing steps performed by segments of source code in accordance with one embodiment of the invention.

Figure 10:
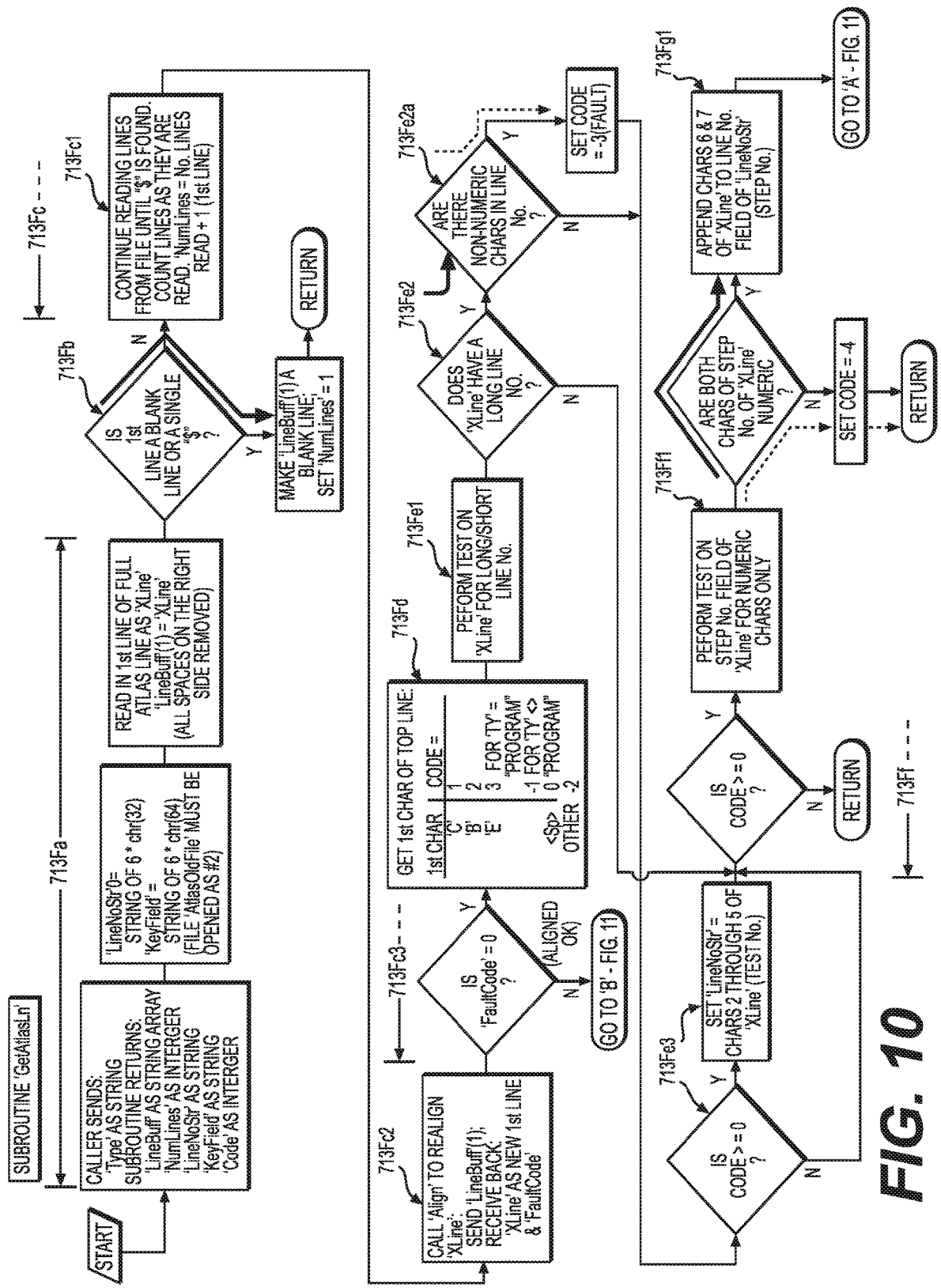
FIG. 10 shows a flow chart associated with processing steps performed by segments of source code in accordance with one embodiment of the invention.

FIG. 10 shows a flow chart associated with processing steps performed by segments of source code in accordance with one embodiment of the invention.

Figure 11:
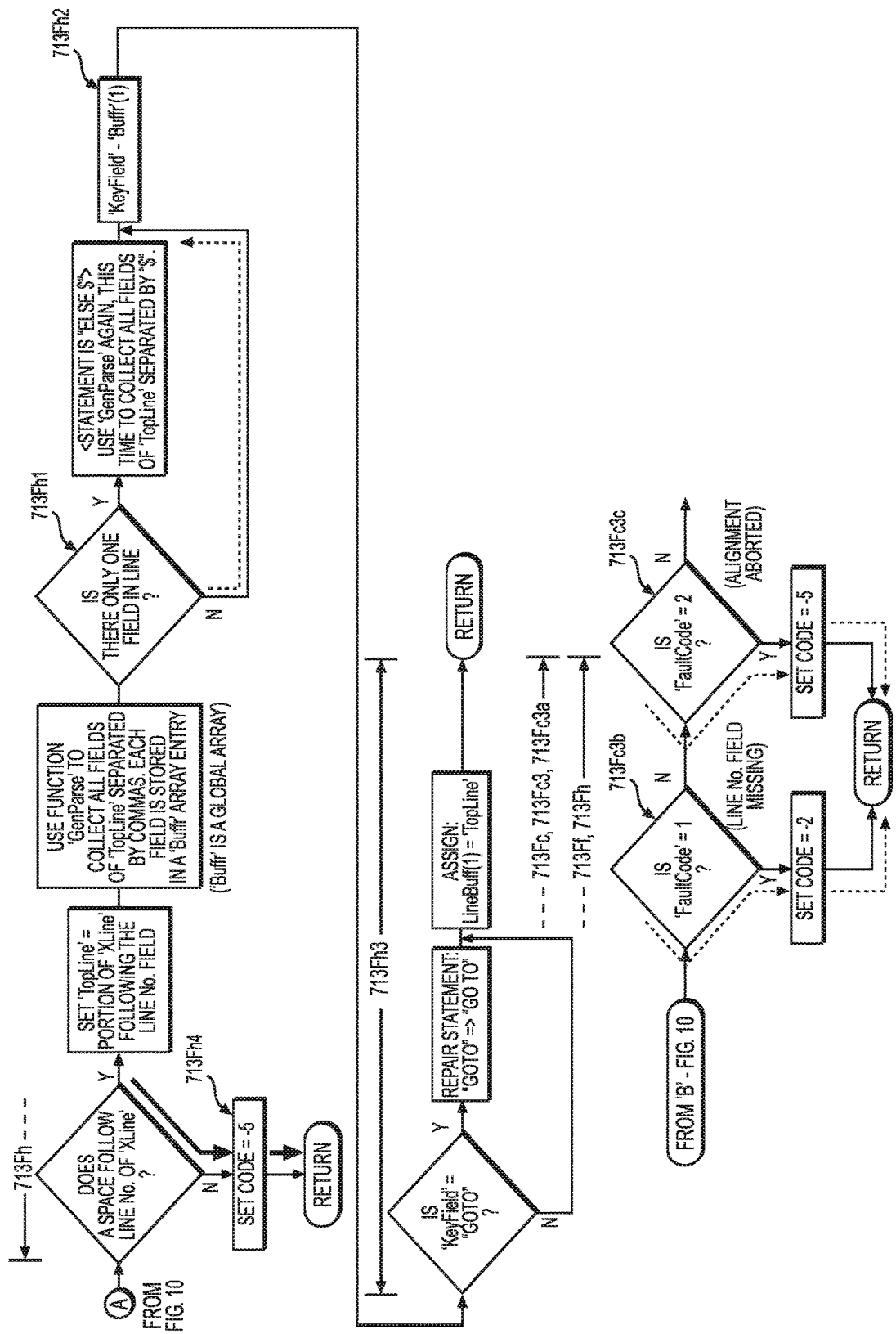
FIG. 11 shows a flow chart associated with processing steps performed by segments of source code in accordance with one embodiment of the invention.

FIG. 11 shows a flow chart associated with processing steps performed by segments of source code in accordance with one embodiment of the invention.

Figure 12:
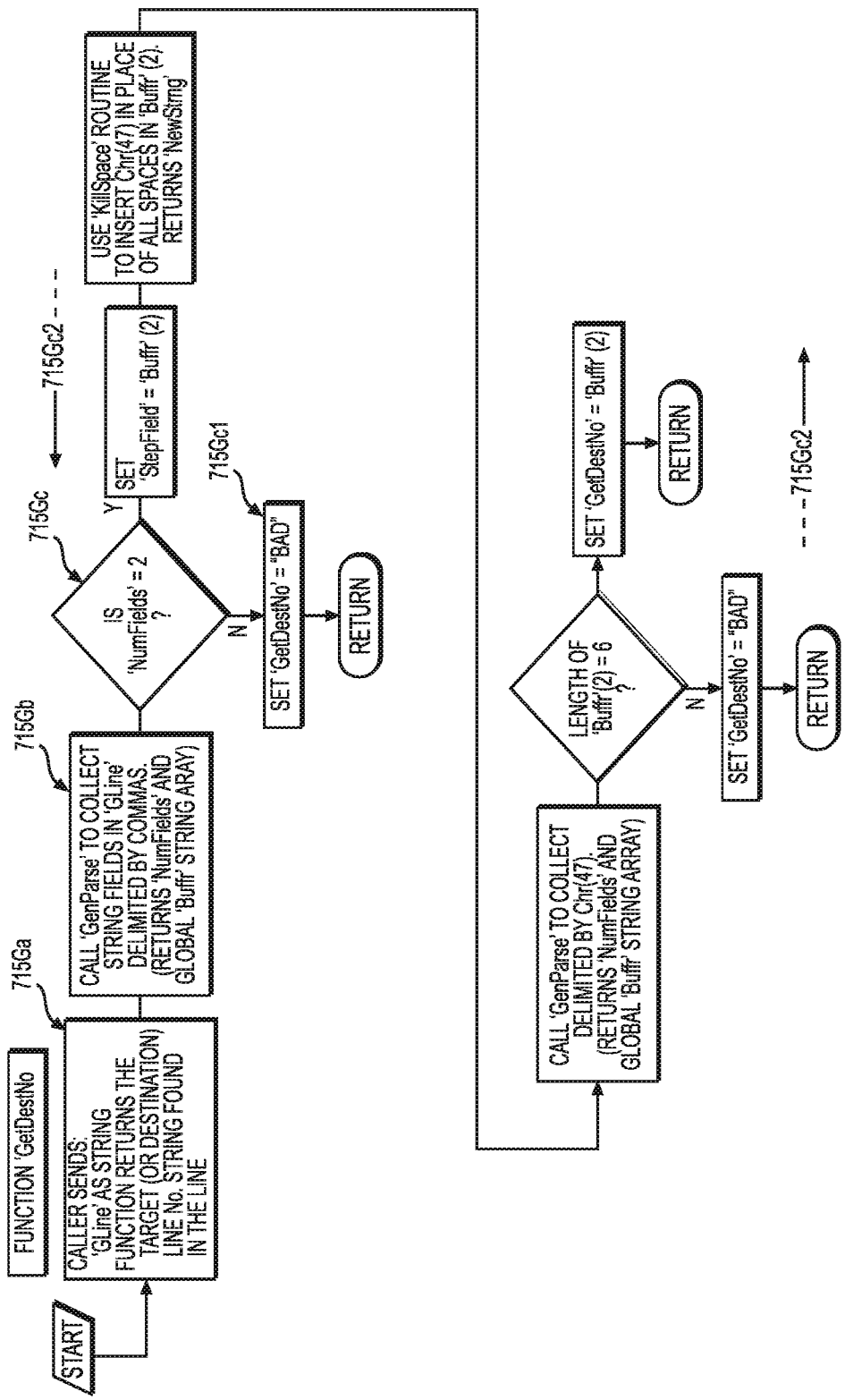
FIG. 12 shows a flow chart associated with processing steps performed by segments of source code in accordance with one embodiment of the invention.

FIG. 12 shows a flow chart associated with processing steps performed by segments of source code in accordance with one embodiment of the invention.

Figure 13A:
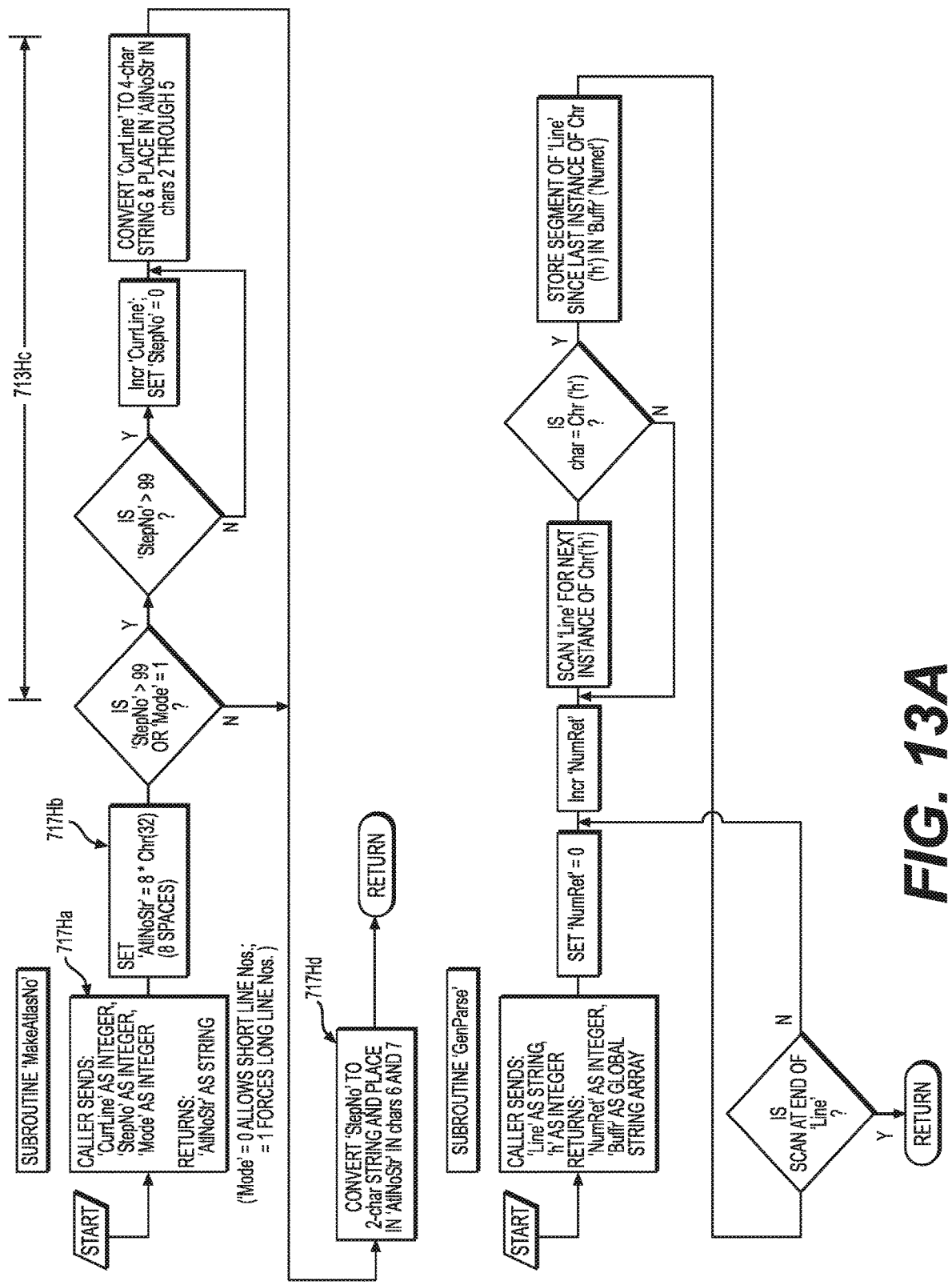
FIG. 13 shows a flow chart associated with processing steps performed by segments of source code in accordance with one embodiment of the invention.
Figure 13B:
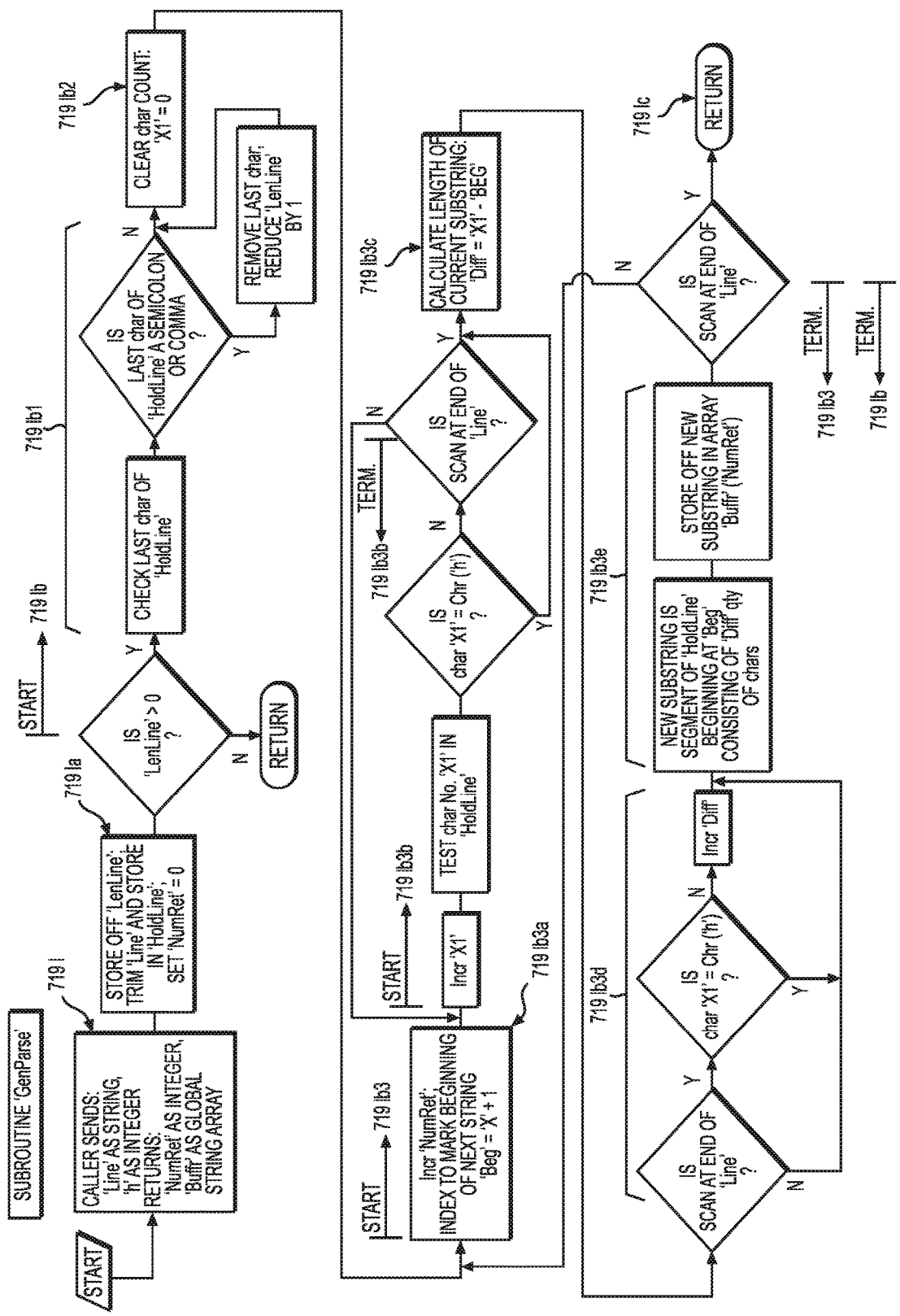

FIG. 13 shows a flow chart associated with processing steps performed by segments of source code in accordance with one embodiment of the invention FIG. 14 shows an outline of blocks of selected source code which are shown in detail in a code appendix filed concurrently with this application and incorporated by reference herein. In particular, a first block includes a GUI Generator (FIGS. 2A, 2B) Generates GUIs to enable user inputs block. Block A includes Pre-Pass and Opening ATLAS Program File AltasOldFile and Initialization of data structures. Block B includes read Atlas file statements, error checking, determining if a GOTO statement exists in a selected statement with a GOTO target number, get target number string, search branch number associated with target number string, determine if target number (branch) already exists, then store GOTO target number in BranchBuff if not already exists then repeat at Read Atlas file statements until no further file statements found. Block C-Pass 1 Code includes code for searching for KeyWords in OLD or pre-modification Atlas code including preprocessing directives (e.g., DEFINE) and statements (e.g., WHILE) an increment various data variables which are used in renumbering from old to new Atlas file including searching for Atlas statements which require restarting of line number sequence e.g., with a step number set to "00". Block D-Pass 2 Code-code includes code for searching for Keywords in NEW or post modification Atlas code along with steps associated with automated renumbering, reformatting, and re-referencing of branching statements or go-to instruction line referencing between old and new Atlas code. Block Align Subroutine includes code for performing Atlas code alignment functions. Block GetAtlasLn subroutine includes code for performing operations to read and parse Atlas code, detect errors, perform specified repairs, and populate various data structures. Block GetDestNo subroutine code includes code to get target or destination line numbers and detect errors. Block MakeAtlasNo subroutine includes code for creating new Atlas line numbers based on processing instructions and data structures. Block GenParse Subroutine includes code for parsing.

Although the invention has been described in detail with reference to certain preferred embodiments, variations and modifications exist within the spirit and scope of the invention as described and defined in the following claims.

The invention claimed is:

1. A system for automated renumbering, reformatting, and re-referencing of code sections including branching statements or go-to instruction line referencing within modified code using a multi-pass approach comprising:

a machine readable storage medium comprising a plurality of non-transitory machine readable instructions comprising:

a user interface module that generates a plurality of user interfaces on a display, wherein the first user interface comprises an initial option selection menu and a second user interface comprises an input field for selecting a user specified increment value;

a pre-pass search module comprising non-transitory machine instructions that searches pre-modified code for each predefined branching statements or go-to instruction line number reference with destination or code target line number and step number and stores search results in an initial and modified line referencing array storing a two column list comprising a first and second data, wherein the first data comprises a pre-modified code branching statement or go-to instruction and corresponding pre-modification target line number reference;

a first pass module comprising non-transitory machine instructions that scan pre-modified code and determine anticipated post-modified code referencing numbers that includes a parsing system that executes a first pass search of the pre-modified code to find each of the branching statement or go-to instruction line target line number references in the pre-modified code determines a predicted or anticipated modified code line number reference, wherein the anticipated or predicted new instruction line number reference stored in the second data is generated by adding the user specified increment to each said first column line number reference stored in the first data, wherein the first pass module further determines a modified line number for preprocessing directives in the pre-modified code by finding line numbers for each compiler directive in the pre-modified code and adding a second line number increment to each pre-modified code line with at least one compiler directives that are preprocessing directives that create conditional compiling parameters that control the compiling of the source code, wherein the compiler directives comprise begin, include, define, declare, require, identify statements, and while/when loop statements, count sublines of code from the code segment statement to an end of segment identifier, a second pass module comprising non-transitory machine instructions that scan pre-modified code and executes a correction pass on the pre-modified pre-modification code that re-sequences and replaces all said instruction line numbers in the pre-modification code, identifies code alignment errors using conditional statement (select case or if-then) matching errors comprising referencing or formatting errors based on reformat each located branching statement or go-to instruction line reference using segmentation code revisions and modification.

2. The system as in claim 1, wherein the end of segment identifier comprises a dollar sign "$".

3. A method of using machines to automate or improve results from tasks associated with modifying pre-existing machine readable instructions that use line numbers to automate renumbering of sequential line numbers in modified machine instructions and perform error identification and correction comprising:

providing a computer system comprising a processor that reads machine readable instructions, a storage medium in communication with the processor, an input/output system, a memory, a display, and a human-machine interface comprising a keyboard;

loading or accessing, using the computer system, a first plurality of machine readable instructions on the storage medium or a remote storage medium accessible by the computer system, wherein each line of the first plurality of machine readable instructions comprise a machine instruction line number beginning section of each line, wherein the first plurality of machine readable instructions comprise one or more branching statements or go-to instruction each comprising a machine instruction line number reference defining a destination or machine instruction target line number, wherein the first plurality of machine readable instruction have machine instruction line numbers listed in sequential increments that incrementally increase as they progress from a first line of the first plurality of machine readable instructions to a last line of the first plurality of machine readable instructions;

modifying, using the computer system, the first plurality of machine readable instructions comprising inserting or removing lines of machine readable instructions without adding or modifying machine instruction line numbers in the first plurality of machine readable instructions to produce a second plurality of machine readable instructions;

loading, using an automated renumbering, error identification, and error correction system, hereinafter "automated system", accessed by or stored on the computer system, wherein the automated system comprises:

a first section comprising a plurality of first section machine readable instructions that generate a user interface on the display that prompts a user to input a plurality of user data or instructions comprising a desired machine instruction numerical increment number data value that defines numerical intervals between re-numbered machine instruction line number references in a third plurality of machine readable instructions;

a second section comprising a plurality of second section machine readable instructions that searches the first plurality of machine readable instructions to identify the one or more branching statements or go-to instructions and record respective said machine instruction line number reference defining the destination or machine instruction target line number associated with each said one or more branching statements or go-to instructions in a first data array as an array of first data;

a third section comprising a plurality of third section machine readable instructions that instantiates or operates a counter in the computer system and then searches each line of the second plurality of machine readable instructions for machine instruction line number references stored in the first data array, wherein the third section increments the counter by the machine instruction numerical increment number when it advances to a next machine instruction line within the second plurality of machine readable instructions, wherein the third section further searches the second plurality of machine readable instructions for machine instruction statements comprising compiler directives that are preprocessing directives that create conditional compiling parameters that control the compiling of the source code, wherein the compiler directives comprise begin, include, define, declare, require, identify statements, and while/when loop statements, count sublines of code from the code segment statement to an end of segment identifier, wherein the third section further increments the counter register by a predetermined additional increment when it finds each said compiler directive, wherein the third section records a counter data in the first data array associated with each one or more branching statement or go-to statement from the counter when the third section finds each of the one or more branching statement or go-to statement;

a fourth section comprising a plurality of fourth section readable instructions that execute a plurality of operations comprising:

a first operation comprising copying or replacing a first machine instruction line number within the second plurality of machine readable instructions;

a second operation comprising resetting or operating the counter in the computer system by setting the counter to an initial numerical machine instruction line number value then increments the counter by the machine instruction numerical increment number when the fourth section begins to parse or select a next machine instruction line within the second plurality of machine readable instructions, wherein the third operation further searches the second plurality of machine readable instructions for machine instruction statements comprising compiler directives that are preprocessing directives that create conditional compiling parameters that control the compiling of the source code, wherein the compiler directives comprise begin, include, define, declare, require, identify statements, and while/when loop statements, wherein the second operation further increments the counter by a predetermined additional increment when it finds each said compiler directive then subsequent counter increments are based on the machine instruction numerical increment number except when another said compiler directive is found wherein the predetermined additional increment is added to the counter;

a third operation that replaces each said machine instruction line number reference for each destination or machine instruction target line number associated with each said one or more branching statements or go-to instructions by matching the first data in the first data array and replacing it with a corresponding or respective second data in the first data array; and a fourth operation that outputs the second plurality of machine readable instructions as a third plurality of machine instructions when the first through third operation is completed with renumbered said machine readable line numbers;

a fifth section comprising a plurality of fifth section machine readable instructions that scans the second plurality of machine readable instructions and identifies code alignment errors using conditional statement (select case or if-then) matching errors comprising referencing or formatting errors based on a reformat of each located branching statement or go-to instruction line reference using segmentation code revisions and modification.

* * * * *